US012775569B2

(12) United States Patent
Xu et al.

(10) Patent No.: US 12,775,569 B2
(45) Date of Patent: Oct. 27, 2026

(54) SERVER SYSTEM, JOB EXECUTION METHOD AND APPARATUS, DEVICE, AND MEDIUM

(71) Applicant: Suzhou MetaBrain Intelligent Technology Co., Ltd., Suzhou (CN)

(72) Inventors: Ran Xu, Suzhou (CN); Yanwei Wang, Suzhou (CN); Lu Lu, Suzhou (CN); Rengang Li, Suzhou (CN); Yaqian Zhao, Suzhou (CN); Jingdong Zhang, Suzhou (CN); Long Yue, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/470,341

(22) PCT Filed: Sep. 23, 2024

(86) PCT No.: PCT/CN2024/120444

§ 371 (c)(1),
(2) Date: Sep. 29, 2025

(87) PCT Pub. No.: WO2025/112837

PCT Pub. Date: Jun. 5, 2025

(65) Prior Publication Data

US 2026/0119433 A1 Apr. 30, 2026

(30) Foreign Application Priority Data

Nov. 28, 2023 (CN) ........................ 202311599060.5

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01); *G06F 2213/0026* (2013.01)

(58) Field of Classification Search
CPC ............. G06F 13/4022; G06F 13/4282; G06F 2213/0026
See application file for complete search history.

(56) References Cited

U.S. PATENT DOCUMENTS 8,189,573 B2 * 5/2012 Congdon ................ H04L 49/30
370/386
10,165,036 B1 * 12/2018 Gigliotti ................ H04L 67/10
(Continued)

FOREIGN PATENT DOCUMENTS

CN 1719415 A 1/2006
CN 104598404 A 5/2015
(Continued)

OTHER PUBLICATIONS

International Search Report of corresponding PCT application (PCT/CN2024/120444) Nov. 9, 2024, 5 pages.
(Continued)

*Primary Examiner* — Nimesh G Patel
(74) *Attorney, Agent, or Firm* — COOPER LEGAL GROUP LLC

(57) ABSTRACT

The present application discloses a server system, a job execution method and apparatus, a device, and a medium. The server system includes a server and an extended computing domain; the server includes a processor control domain and a local computing domain, the local computing domain includes a plurality of local computing units, the processor control domain is connected to the local computing units, and the local computing units are configured to execute local computing tasks; the extended computing domain includes an extended controller and a plurality of extended computing units connected to the extended controller, the server is connected to the extended controller through an extended cable compliant with a peripheral component interconnect express protocol and/or an external (Continued)

communication interface, the extended controller is configured to communicate with the server to acquire extended computing tasks, and the extended computing units are configured to execute the extended computing tasks.

20 Claims, 8 Drawing Sheets

(56) References Cited

U.S. PATENT DOCUMENTS

| | | | | |
|---|---|---|---|---|
| 10,523,585 | B2 * | 12/2019 | Davis | G06F 12/0811 |
| 12,120,175 | B2 * | 10/2024 | Bernat | H04L 67/59 |
| 2014/0280669 | A1 * | 9/2014 | Harper, III | G06F 9/547 709/213 |
| 2015/0341422 | A1 * | 11/2015 | Färnlöf | G06F 9/542 709/202 |
| 2018/0046513 | A1 * | 2/2018 | Breakstone | G06F 9/5016 |
| 2022/0350767 | A1 * | 11/2022 | McGraw | G06F 11/2007 |
| 2022/0374262 | A1 * | 11/2022 | Bahl | G06F 9/505 |
| 2024/0143534 | A1 * | 5/2024 | Miglani | G02B 6/3518 |

FOREIGN PATENT DOCUMENTS

| | | | |
|---|---|---|---|
| CN | 111679860 | A | 9/2020 |
| CN | 112486646 | A | 3/2021 |
| CN | 113821311 | A | 12/2021 |
| CN | 114840339 | A | 8/2022 |
| CN | 115858146 | A | 3/2023 |
| CN | 116204448 | A | 6/2023 |
| CN | 117312215 | A | 12/2023 |

OTHER PUBLICATIONS

Written Opinion of International Searching Authority of corresponding PCT application (PCT/CN2024/120444) Nov. 9, 2024, 7 pages.

First Office Action of corresponding CN priority application (CN202311599060.5) Jan. 5, 2024, 14 pages.

Notification to Grant Patent Right for Invention of corresponding CN priority application (CN202311599060.5) Feb. 28, 2024, 3 pages.

* cited by examiner

SERVER SYSTEM, JOB EXECUTION METHOD AND APPARATUS, DEVICE, AND MEDIUM

CROSS-REFERENCE TO RELATED APPLICATION

This application claims priority to Chinese Patent Application No. 202311599060.5, filed on Nov. 28, 2023 in China National Intellectual Property Administration and entitled "Server System, Job Execution Method and Apparatus, Device, and Medium", which is hereby incorporated by reference in its entirety.

FIELD

The present application relates to the field of computer technology, and more, to a server system, a job execution method and apparatus, a device, and a medium.

BACKGROUND

Artificial intelligence servers need to continuously extend computing units to meet growing computational demands of the era. In existing server architecture, extension of computing units is implemented by increasing a quantity of central processing unit (CPU) channels. However, due to the limitations of processor channel scale and server space, the extensibility of computing units in the related art is relatively low and the extended quantity is limited.

Therefore, it is a technical challenge for persons skilled in the art to improve the extensibility and extended quantity of computing units.

SUMMARY

The present application provides a server system, including a server and an extended computing domain, where the server includes a processor control domain and a local computing domain, the local computing domain includes a plurality of local computing units, the processor control domain is connected to the local computing units through peripheral component interconnect express protocol interfaces, and the local computing units are configured to execute local computing tasks; and the extended computing domain includes an extended controller and a plurality of extended computing units connected to the extended controller, the server is connected to the extended controller through an extended cable compliant with a peripheral component interconnect express protocol and/or an external communication interface, the extended controller is configured to communicate with the server to acquire extended computing tasks, and the extended computing units are configured to execute the extended computing tasks.

The extended controller communicates with the server based on an external communication protocol, and the external communication protocol includes a remote direct memory access communication protocol and/or an Ethernet protocol.

The extended controller includes a control unit and a switching unit, the control unit is configured for control flow communication with the server, and the switching unit is configured for data flow communication with the server.

The switching unit includes an upstream port, a switching matrix, and downstream ports, which are sequentially connected; the switching unit is configured for data flow communication with the processor control domain through the upstream port, and data flow communication with the extended computing units through the downstream ports; each downstream port is connected to one of the extended computing units, and there is a communication connection between every two downstream ports in the switching matrix.

The extended computing unit includes any one or a combination of any of a graphics processing unit, a field-programmable gate array, and an extended processing unit.

The extended computing units communicate based on an internal communication protocol, and the internal communication protocol includes a peripheral component interconnect express protocol and/or a peer-to-peer transmission protocol of a peripheral component interconnect express protocol.

In the process of communication between the extended controller and the server, a controller at a sending end enters a kernel state to create a communication link between the sending end and a receiving end, copies data that needs to be sent in a memory of the sending end to a hardware cache, encapsulates data that needs to be sent in the hardware cache into data packets according to a communication protocol between the sending end and the receiving end, and sends the data packets to the receiving end through the communication link, where if the sending end is the server and the receiving end is the extended computing unit, the controller at the sending end is the processor control domain; or if the sending end is the extended computing unit and the receiving end is the server, the controller at the sending end is the extended controller.

In the process of communication between the extended controller and the processor control domain based on the remote direct memory access communication protocol, a controller at a sending end bypasses a kernel state, copies data that needs to be sent to a hardware cache, encapsulates data that needs to be sent in the hardware cache into data packets based on the remote direct memory access communication protocol, and sends the data packets to a receiving end, where if the sending end is the server and the receiving end is the extended computing unit, the controller at the sending end is the processor control domain; or if the sending end is the extended computing unit and the receiving end is the server, the controller at the sending end is the extended controller.

A memory of the local computing unit communicates with a memory of the extended computing unit through direct memory access.

The local computing units are configured to execute computing tasks with delay sensitivity greater than or equal to a first preset value, the extended computing units are configured to execute computing tasks with delay sensitivity less than the first preset value, communication sparsity between computing tasks executed within the extended computing domain is less than or equal to a second preset value, and communication sparsity between computing tasks executed within the extended computing domain and computing tasks executed within the local computing domain is greater than the second preset value.

The processor control domain is configured to merge computing task execution results of the local computing units and computing task execution results of the extended computing units.

The present application provides a job execution method, applied to the server in the foregoing server system, and including:

acquiring a target job and splitting the target job into a plurality of computing tasks;

sending the computing tasks to the local computing units in the server and the extended computing units in the extended computing domain of the server system for execution;

acquiring local computing task execution results of the local computing units and extended computing task execution results of the extended computing units; and merging the local computing task execution results and the computing task execution results to obtain an execution result of the target job.

Before the sending the computing tasks to the local computing units in the server and the extended computing units in the extended computing domain of the server system for execution, the method further includes:

dividing the computing tasks into local computing tasks and extended computing tasks based on delay sensitivity of the computing tasks and communication sparsity between the different computing tasks.

The local computing tasks are computing tasks with delay sensitivity greater than or equal to a first preset value, the extended computing tasks are computing tasks with delay sensitivity less than the first preset value, the communication sparsity between the extended computing tasks is less than or equal to a second preset value, and the communication sparsity between the extended computing tasks and the local computing tasks is greater than the second preset value.

The sending the computing tasks to the local computing units in the server and the extended computing units in the extended computing domain of the server system for execution includes:

sending the local computing tasks to the local computing units in the server for execution, and sending the extended computing tasks to the extended computing units in the extended computing domain of the server system for execution.

The target job is a model training job, and the splitting the target job into a plurality of computing tasks includes:

splitting the model training job into a plurality of sub model training jobs;

correspondingly, the sending the computing tasks to the local computing units in the server and the extended computing units in the extended computing domain of the server system for execution includes:

sending the sub model training jobs to the local computing units in the server and the extended computing units in the extended computing domain of the server system for execution, to obtain trained sub models;

correspondingly, the acquiring local computing task execution results of the local computing units and extended computing task execution results of the extended computing units includes:

acquiring the sub models trained by the local computing units and the sub models trained by the extended computing units;

correspondingly, the merging the local computing task execution results and the computing task execution results to obtain an execution result of the target includes:

merging the sub models trained by the local computing units and the sub models trained by the extended computing units to obtain a trained model.

The target job is a federated learning job, and the splitting the target job into a plurality of computing tasks includes:

splitting the federated learning job into model training tasks and parameter update tasks;

correspondingly, the sending the computing tasks to the local computing units in the server and the extended computing units in the extended computing domain of the server system for execution includes:

sending the parameter update tasks to the local computing units in the server, whereby the local computing units update model parameters of models based on a merged gradient in the parameter update tasks, where the merged gradient is a result of merging gradients trained by the plurality of extended computing units; and sending the model training jobs to the extended computing units in the extended computing domain of the server system, whereby the extended computing units use local data to train models corresponding to the model training jobs to obtain gradients, where the models corresponding to the model training jobs are latest models updated by the local computing units;

correspondingly, the acquiring local computing task execution results of the local computing units and extended computing task execution results of the extended computing units includes:

acquiring the gradients trained by the extended computing units; and acquiring the latest models updated by the local computing units;

correspondingly, the merging the local computing task execution results and the computing task execution results includes:

merging the gradients trained by the plurality of extended computing units to obtain the merged gradient.

The present application provides a job execution apparatus, applied to the server in the foregoing server system, the apparatus including:

a splitting module, configured to acquire a target job and split the target job into a plurality of computing tasks;

a sending module, configured to send the computing tasks to the local computing units in the server and the extended computing units in the extended computing domain of the server system for execution;

an acquisition module, configured to acquire local computing task execution results of the local computing units and extended computing task execution results of the extended computing units; and a merging module, configured to merge the local computing task execution results and the computing task execution results to obtain an execution result of the target job.

The present application provides an electronic device, including:

a memory, configured to store computer-readable instructions; and a processor, configured to, when executing the computer-readable instructions, implement the steps of the foregoing job execution method.

The present application provides one or more non-volatile computer-readable storage media storing computer-readable instructions, the computer-readable instructions, when executed by one or more processors, enabling the one or more processors to execute the steps of the foregoing job execution method.

Correspondingly, the processor control domain includes any one or a combination of a microcontroller, a programmable logic controller, a digital signal processor, a field-programmable gate array, and a central processing unit.

Correspondingly, the plurality of local computing units include any one or a combination of a graphics computing processor, a field-programmable gate array, a tensor processing unit accelerator card, a data processing unit, and a neural network processor.

Correspondingly, the control unit includes any one or a combination of an operation control core, an instruction decoder, a clock and timing controller, and a data buffer.

BRIEF DESCRIPTION OF THE DRAWINGS

To illustrate the technical solutions in the embodiments of the present application or in the related art more clearly, the accompanying drawings required in the description of the embodiments or the related art will be briefly introduced below. Apparently, the drawings in the following description show merely some embodiments of the present application, and a person of ordinary skill in the art may derive other drawings from these drawings without any creative efforts. The accompanying drawings are intended to provide a further understanding of the present disclosure, constitute a part of the description, and are used for interpreting the present disclosure together with the following specific embodiments, rather than limiting the present disclosure. In the figures.

DETAILED DESCRIPTION

The technical solutions in the embodiments of the present application will be clearly and completely described below in conjunction with the drawings therein. Apparently, the described embodiments are merely part of the embodiments of the present application, not all of them. Based on the embodiments in the present application, all other embodiments obtained by persons of ordinary skill in the art without creative efforts shall fall within the scope of protection of the present application. Moreover, in the embodiments of the present application, the terms “first”, “second”, and the like are used to distinguish similar objects and are not necessarily used to describe a specific order or sequence.

Figure 1:
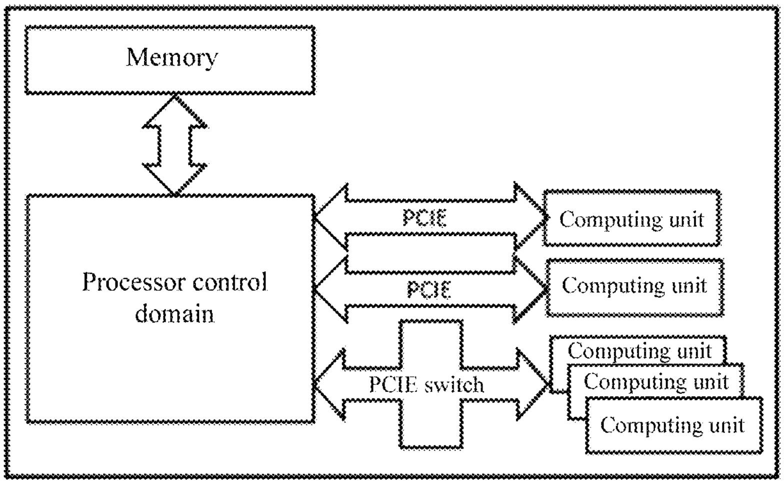
FIG. 1 is a structural diagram of a server system in the related art.
Figure 2:
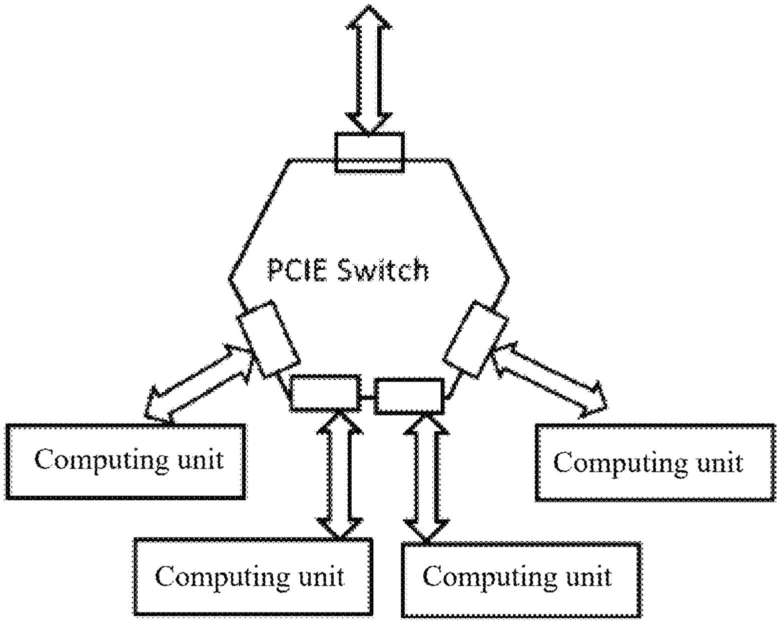
FIG. 2 is a schematic diagram of a PCIe switch extension mode in the related art.

In existing server architecture, the extension of computing units is implemented by increasing a quantity of CPU channels. As shown in FIG. 1, a processor control domain is connected to a memory, and the processor control domain is connected to computing units through PCIe interfaces to implement extension of the computing units. Due to the limitation of the quantity of CPU channels, in addition to a few directly connected computing units, tree-like cascading extension may be further implemented through a PCIe switch. A PCIe switch extension mode is shown in FIG. 2. Due to the limitations of processor channel scale and server space, the extensibility of computing units in the related art is relatively low and the extended quantity is limited.

Therefore, based on the extension of computing units through a local computing domain, an extended computing domain is added in the present application to implement incremental extension of computing units. A server is connected to the extended computing domain through a PCIe extended cable or an external communication interface, thereby achieving a weak coupling connection between the server and the extended computing domain and achieving a weak coupling extension of computing units. Further, as an independent running unit of the server, the extended computing domain includes an extended controller for controlling the extended computing units within the extended computing domain, thereby enabling exchange with an upstream server and transmitting extended computing tasks to downstream extended computing units, that is, the logic of the extended computing domain is controlled by the extended controller instead of a processing control domain in the server, and processing channels are occupied only when the extended controller communicates with the server and not occupied at other time, whereby the extension of computing units is not limited by server processing channels and space, server processing channels do not need to be increased, and low-cost extension of computing units is achieved. It can be seen that the present application achieves low-cost and weakly coupled incremental extension of computing units, and improves the extensibility and extended quantity of computing units.

An embodiment of the present application discloses a server system, including a server and an extended computing domain; the server includes a processor control domain and a local computing domain, the local computing domain includes a plurality of local computing units, the processor control domain is connected to the local computing units through peripheral component interconnect express protocol interfaces, and the local computing units are configured to execute local computing tasks; and the extended computing domain includes an extended controller and a plurality of extended computing units connected to the extended controller, the server is connected to the extended controller through an extended cable compliant with a peripheral component interconnect express protocol and/or an external communication interface, the extended controller is configured to communicate with the server to acquire extended computing tasks, and the extended computing units are configured to execute the extended computing tasks.

Figure 3:
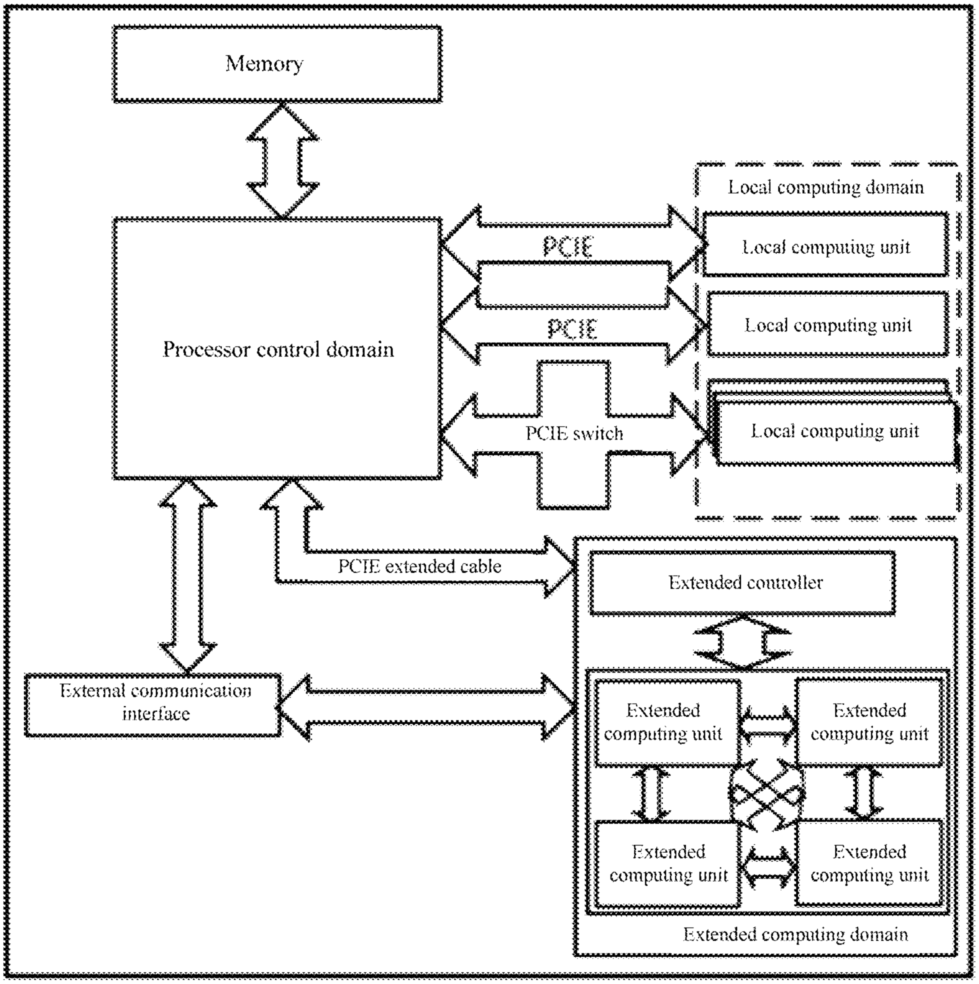
FIG. 3 is a structural diagram of a server system according to one or more exemplary embodiments.

In this embodiment, as shown in FIG. 3, the extension of computing units is implemented through the local computing domain, that is, the processor control domain is connected to the computing units through PCIe interfaces, and may also be connected to the plurality of computing units through a PCIe switch to achieve tree-like cascading extension of computing units. The CPU and the local computing domain serve as main control domains, whereby some delay-sensitive and indivisible tasks may be run on the local computing domain. The processor control domain includes any one or a combination of a microcontroller, a programmable logic controller (PLC), a digital signal processor (DSP), a field-programmable gate array (FPGA), and a CPU conventionally used in the server. The local computing unit may be a graphics computing processor, a field-programmable gate array, a tensor processing unit (TPU) accelerator card, a data processing unit (DPU), a neural network processor (NPU), or the like.

On this basis, further extension of computing units is implemented through the extended computing domain. The extended computing domain serves as an auxiliary control domain or a sub control domain. Some tasks that are relatively insensitive to delay requirements and interact less frequently with other tasks may run in the extended computing domain to prevent overall system performance degradation caused by frequent communication.

The extended computing domain includes an extended controller and a plurality of extended computing units connected to the extended controller. The extended computing unit may include a graphics processing unit (GPU), a field-programmable gate array (FPGA), or an extended processing unit (xPU). As an autonomous running unit independent of a host system, the extended controller in the extended computing domain may be implemented by an FPGA or a chip. The extended controller implements exchange with an upstream server and transmits extended computing tasks to downstream extended computing units.

As a feasible implementation, the extended controller includes a control unit and a switching unit, the control unit is configured for control flow communication with the server, and the switching unit is configured for data flow communication with the server.

Figure 4:
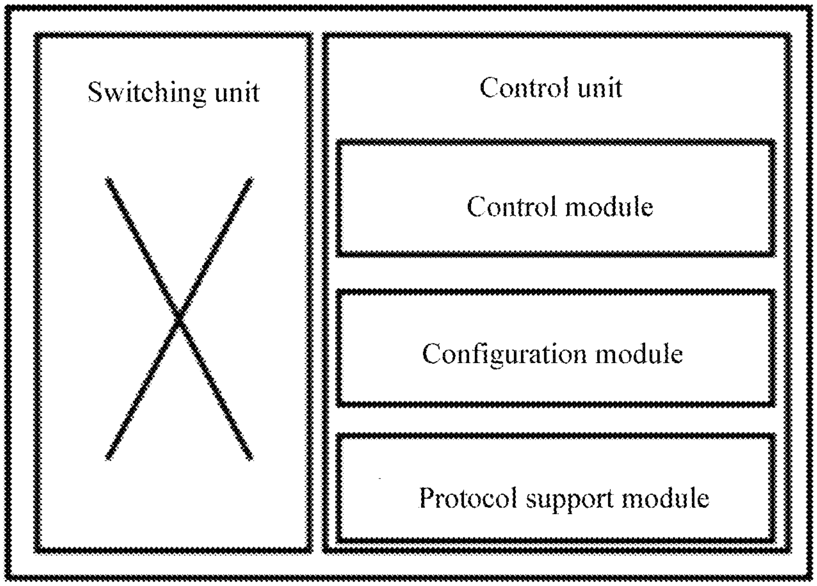
FIG. 4 is a structural diagram of an extended controller according to one or more exemplary embodiments.

In specific implementation, as shown in FIG. 4, the extended controller includes a control unit and a switching unit, the control unit cooperates with the switching unit, the control unit is configured for control flow, and the switching unit is configured for data flow. The control unit includes any one of an operation control core, an instruction decoder, a clock and timing controller, and a data buffer, or is integrated by some of them. The integrated control unit may implement the functions of a control module, a configuration module, a protocol support module, and the like. Specific functions may be configured by manually operating the control unit. The control unit includes a control module, a configuration module, and a protocol support module. The main functions of the control module and the configuration module include: device enumeration detection, configuration space information settings, creation of various resources required for communication, device communication methods, upstream and downstream command parsing, interface connection management, link training, and the like. For example, the resources required for communication include remote direct memory access (RDMA) control on a transmitting end and a receiving end of a channel to create a queue pair (QP), a completion queue (CQ), a memory region (MR), and the like; the device communication methods include peer-to-peer (P2P), direct memory access (DMA), GPU direct access (GPUDirect), and the like; and the interface connection management includes interconnection of interface modules in a switch and the like. The protocol support module supports internal communication protocols such as a peripheral component interconnect express protocol, a peer-to-peer transmission protocol of the peripheral component interconnect express protocol, and a neural network processor interconnection protocol, as well as external communication protocols such as a remote direct memory access communication protocol and an Ethernet protocol.

The extended controller communicates with the server based on an external communication protocol, including a remote direct memory access (RDMA) communication protocol or an Ethernet protocol. According to different extended computing units, the protocol support module supports the extension of different types of computing units through protocol switching, and supports different modes of protocol parsing through communication with the server. The extended computing units communicate based on an internal communication protocol, including a peripheral component interconnect express (PCIe) protocol, a PCIe peer-to-peer transmission protocol, a NVLink, or the like, to form a connection mode with high cohesion within the extended computing domain and weak coupling outside the extended computing domain.

As a feasible implementation, the switching unit includes an upstream port, a switching matrix, and downstream ports, which are sequentially connected; the switching unit is configured for data flow communication with the processor control domain through the upstream port, and data flow communication with the extended computing units through the downstream ports; and each downstream port is connected to one of the extended computing units, and there is a communication connection between every two downstream ports in the switching matrix.

Figure 5:
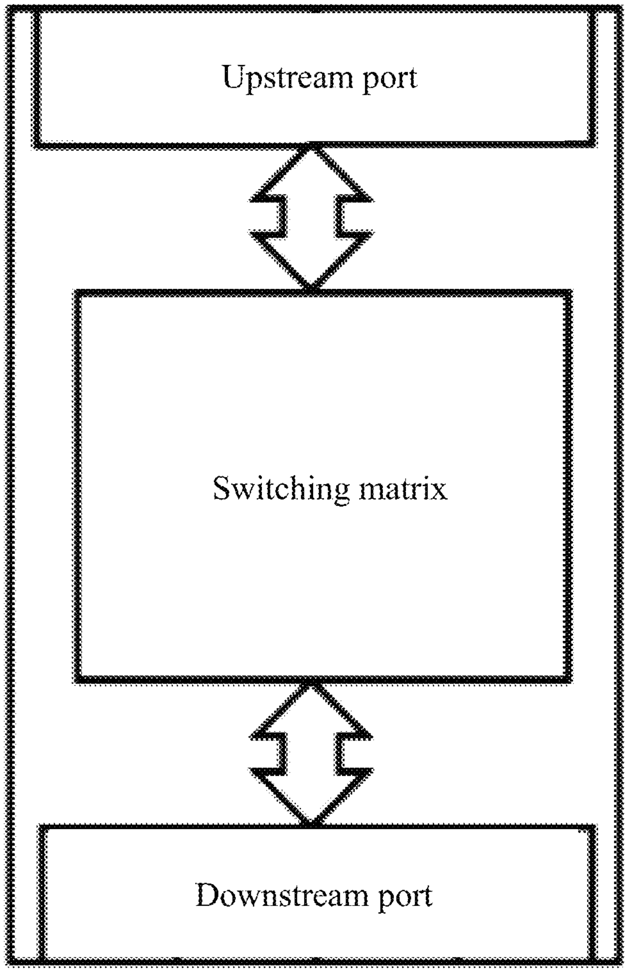
FIG. 5 is a structural diagram of a switching unit according to one or more exemplary embodiments.
Figure 6:
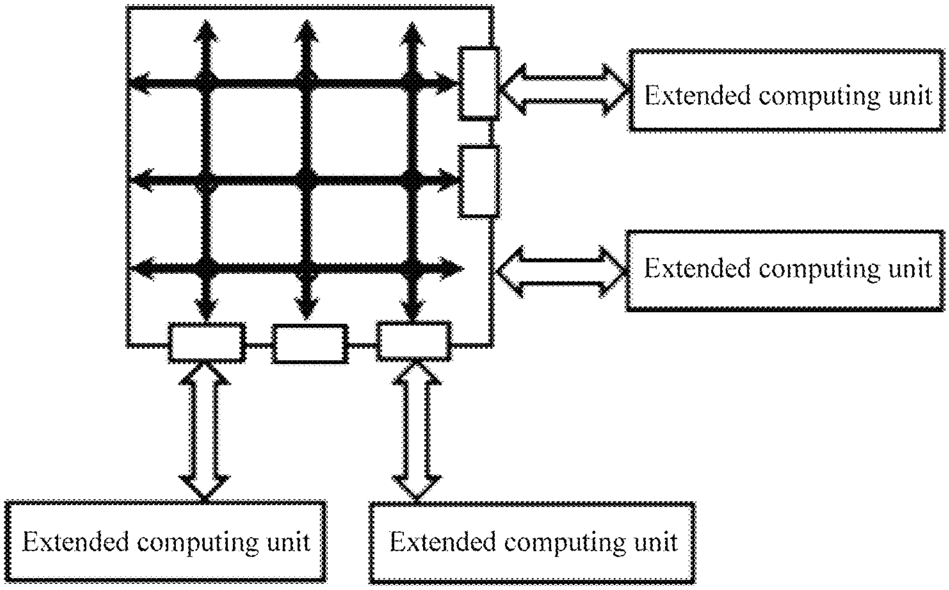
FIG. 6 is a schematic diagram of a connection method between a switching matrix and computing units according to one or more exemplary embodiments.

In specific implementation, as shown in FIG. 5, the switching unit includes an upstream port, downstream ports, and a switching matrix, where the upstream interface is connected to the server, while the downstream interfaces are connected to the extended computing units. However, unlike topology connections in a PCIe switch, the switching matrix is configured not only to forward communication messages between an upstream interface and a corresponding downstream interface, but also to extend topology connections between computing units. The switching matrix is a hardware structure on a backplane switch, and is configured to achieve high-speed peer-to-peer connections between various circuit boards. A connection method between the switching matrix and the computing units is shown in FIG. 6. Each downstream port is connected to one extended computing unit, and there is a communication connection between every two downstream ports in the switching matrix. Compared with tree-like computing unit extension, matrix-based computing unit extension is implemented, which improves the extensibility and extended quantity of computing units.

The server may be connected to the extended domain through a PCIe extended cable or an external communication interface. The PCIe extended cable involves a bus-level extension, which is different from conventional modes that rely on high-cost CPU channel extension to extend the quantity of communication channels, or rely on a limited extended quantity of fixed channels in the PCIe switch in limited space. By means of the independent control unit, the extended controller may break through space and quantity limitations based on a bus extension mode, such as implement a high-speed fully interconnected structure based on a self-developed lightweight protocol under the architecture of FIG. 6. The external communication interface may have a plurality of modes, such as a RDMA communication protocol with low kernel overhead, an Ethernet protocol, or a motherboard registered jack 45 (RJ45) network port with high CPU resource occupation.

As a feasible implementation, in the process of communication between the extended controller and the server, a controller at a sending end enters a kernel state to create a communication link between the sending end and a receiving end, copies data that needs to be sent in a memory of the sending end to a hardware cache, encapsulates data that needs to be sent in the hardware cache into data packets according to a communication protocol between the sending end and the receiving end, and sends the data packets to the receiving end through the communication link, where if the sending end is the server and the receiving end is the extended computing unit, the controller at the sending end is the processor control domain; or if the sending end is the extended computing unit and the receiving end is the server, the controller at the sending end is the extended controller.

When the server sends data to the extended computing unit, the processor control domain enters the kernel state to create a communication link between the server and the extended controller and create various resources required for communication, while the extended controller serves as the receiving end to parse the communication protocol, configure information such as a cache address for storing data, and notify hardware such as a network card to prepare for data reception. The processor control domain configures information such as a cache address for sending data and a data length, and notifies hardware such as a network card to send data. The processor control domain copies data that needs to be sent in a cache of a memory to a cache of hardware such as a network card, then encapsulates data into data packets according to a protocol, sends the data packets to the extended controller. After receiving the data packets, the extended controller writes the data packets into the memory of the extended computing unit. When the extended computing unit sends data to the server, the extended controller enters the kernel state to create a communication link between the server and the extended controller and create various resources required for communication, while the processor control domain serves as the receiving end to parse the communication protocol, configure information such as a cache address for storing data, and notify hardware such as a network card to prepare for data reception. The extended controller configures information such as a cache address for sending data and a data length, and notifies hardware such as a network card to send data. The extended controller copies data that needs to be sent in the memory of the extended computing unit to the cache of the hardware such as a network card, then encapsulates data into data packets according to a protocol, sends the data packets to the processor control domain. After receiving the data packets, the processor control domain writes the data packets into the memory.

As another feasible implementation, in the process of communication between the extended controller and the processor control domain based on the remote direct memory access communication protocol, a controller at a sending end bypasses a kernel state, copies data that needs to be sent to a hardware cache, encapsulates data that needs to be sent in the hardware cache into data packets based on the remote direct memory access communication protocol, and sends the data packets to the receiving end, where if the sending end is the server and the receiving end is the extended computing unit, the controller at the sending end is the processor control domain; or if the sending end is the extended computing unit and the receiving end is the server, the controller at the sending end is the extended controller.

In specific implementation, the processor control domain may interact with the extended controller through RDMA. This implementation differs from the foregoing implementation in that the controller at the sending end bypasses the kernel state and copies the data that needs to be sent to the hardware cache, without the participation of the memory of the sending end.

As still another feasible implementation, a memory of the local computing unit communicates with a memory of the extended computing unit through direct memory access. In specific implementation, if the extended computing unit is a GPU, GPUdirect RDMA may be employed to directly encapsulate the memory of the local computing unit into a data packet based on a protocol and send the data packet to the memory of the extended computing unit, or encapsulate the memory of the extended computing unit into a data packet based on a protocol and send the data packet to the memory of the local computing unit.

As an implementation, the local computing units are configured to execute computing tasks with delay sensitivity greater than or equal to a first preset value, the extended computing units are configured to execute computing tasks with delay sensitivity less than the first preset value, communication sparsity between computing tasks executed within the extended computing domain is less than or equal to a second preset value, and communication sparsity between computing tasks executed within the extended computing domain and computing tasks executed within the local computing domain is greater than the second preset value.

In specific implementation, for some jobs that require computational splitting, such as distributed machine learning, computing tasks may be divided into local computing tasks and extended computing tasks, the local computing tasks are high delay-sensitive or indivisible computing tasks, while the extended computing tasks are low delay-sensitive computing tasks. Meanwhile, the low communication sparsity between computing tasks executed within the extended computing domain represents dense communication, while the high communication sparsity between computing tasks executed within the extended computing domain and computing tasks executed within the local computing domain represents sparse communication, ultimately achieving the effects of high cohesion and low coupling to form high-performance computing within the extended computing domain and incremental improvement of system computing performance between computing domains.

Assuming that a percentage of the local computing tasks in the local computing domain to the total computing tasks is X, a percentage of the extended computing tasks in the extended computing domain to the total computing tasks is Y, $X+Y=1$, the improved performance of the extended computing domain is N times, and the resulting communication overhead is Z, a total performance acceleration ratio is $1/(X+Y/N+Z)$. From the above formula, it can be seen that, without considering communication overhead, the higher the performance improvement ratio of the extended domain, the higher the system acceleration performance improvement. However, excessive communication overhead reduces system performance.

As a feasible implementation, the processor control domain is configured to merge computing task execution results of the local computing units and computing task execution results of the extended computing units. In specific implementation, after different computing domains complete computations, the processor control domain merges final computing results, and completes the computing tasks after processing.

According to the server system provided in the embodiment of the present application, based on the extension of computing units by the local computing domain, the extended computing domain is added to implement incremental extension of computing units. The server is connected to the extended computing domain through the PCIe extended cable or the external communication interface, thereby achieving a weak coupling connection between the server and the extended computing domain and achieving a weak coupling extension of computing units. Further, as an independent running unit of the server, the extended computing domain includes the extended controller for controlling the extended computing units within the extended computing domain, thereby enabling exchange with an upstream server and transmitting extended computing tasks to downstream extended computing units, that is, the logic of the extended computing domain is controlled by the extended controller instead of the processing control domain in the server, and processing channels are occupied only when the extended controller communicates with the server and not occupied at other time, whereby the extension of computing units is not limited by server processing channels and space, server processing channels do not need to be increased, and low-cost extension of computing units is achieved. Therefore, the server system provided in the embodiment of the present application achieves low-cost and weakly coupled incremental extension of computing units, and improves the extensibility and extended quantity of computing units.

Figure 7:
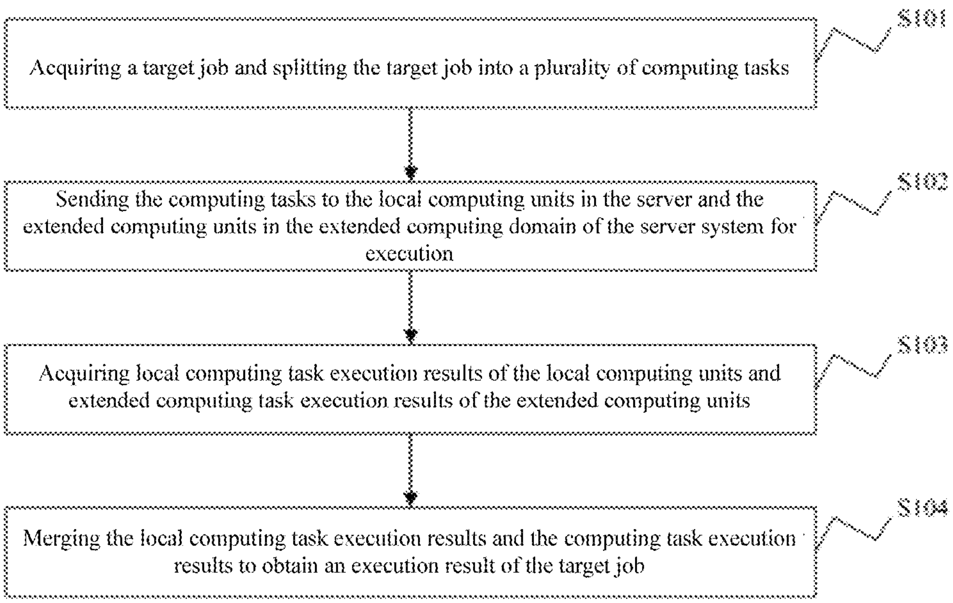
FIG. 7 is a flowchart of a job execution method according to one or more exemplary embodiments.

An embodiment of the present application discloses a job execution method. FIG. 7 is a flowchart of a job execution method according to an exemplary embodiment. As shown in FIG. 7, the job execution method includes:

S101: Acquiring a target job and splitting the target job into a plurality of computing tasks.

S102: Sending the computing tasks to the local computing units in the server and the extended computing units in the extended computing domain of the server system for execution.

This embodiment is applied to the server system provided in the foregoing embodiments. In specific implementation, the target job is split into the plurality of computing tasks, and the computing tasks are sent to the local computing units in the local computing domain and the extended computing units in the extended computing domain for execution.

As an implementation, before sending the computing tasks to the local computing units in the server and the extended computing units in the extended computing domain of the server system for execution, the job execution method further includes: dividing the computing tasks into local computing tasks and extended computing tasks based on delay sensitivity of the computing tasks and communication sparsity between the different computing tasks, where the local computing tasks are computing tasks with delay sensitivity greater than or equal to a first preset value, the extended computing tasks are computing tasks with delay sensitivity less than the first preset value, the communication sparsity between the extended computing tasks is less than or equal to a second preset value, and the communication sparsity between the extended computing tasks and the local computing tasks is greater than the second preset value.

In specific implementation, computing tasks may be divided into local computing tasks and extended computing tasks, the local computing tasks are high delay-sensitive or indivisible computing tasks, while the extended computing tasks are low delay-sensitive computing tasks. Meanwhile, the low communication sparsity between computing tasks executed within the extended computing domain represents dense communication, while the high communication sparsity between computing tasks executed within the extended computing domain and computing tasks executed within the local computing domain represents sparse communication, ultimately achieving the effects of high cohesion and low coupling to form high-performance computing within the extended computing domain and incremental improvement of system computing performance between computing domains.

Further, the local computing tasks are sent to the local computing units in the server for execution, and the extended computing tasks are sent to the extended computing units in the extended computing domain of the server system for execution. In specific implementation, based on task division results, the local computing tasks and the extended computing tasks are mapped to the local computing domain and the extended computing domain respectively. In order to provide a high-performance and flexible computing base as much as possible, high-speed interconnection communication between computing regions is employed in both the local computing domain and the extended computing domain, and the task domains may achieve high-performance computation in a highest parallel computing and high-speed communication manner based on hardware resource status, connection topology information, task type, and the like. The difference is that the local computing domain is controlled by the CPU, while the extended computing domain is controlled by the extended controller.

S103: Acquiring local computing task execution results of the local computing units and extended computing task execution results of the extended computing units.

S104: Merging the local computing task execution results and the computing task execution results to obtain an execution result of the target job.

In specific implementation, in an ideal computing method, the local computing domain is decoupled from the extended computing domain, and after different computing domains complete computations, the processor control domain merges final computing results, and completes the computing tasks after processing. In a non-ideal state, there exists a state of task coupling between the local computing domain and the extended computing domain, but the foregoing task division minimizes the coupling, i.e., reduces interaction between different computing domains. The interaction process employs a different communication method with the processor control domain according to different extension methods, or in order to maximize performance, all available extension communication methods may be employed to interact with the processor control domain, finally the task cooperation is completed, and the processor control domain merges the results to complete the job.

The job execution method provided in the present application utilizes the server system provided in the foregoing embodiments to execute the target job, thereby improving job execution efficiency.

The foregoing embodiment may be applied to error detection, including dual core lockstep detection and heterogeneous parallel multi-core detection. The core idea of dual core lockstep detection technology is to use two identical processor cores in a computer system and allow them to execute the same instruction sequence simultaneously. In the execution process, the two processor cores compare their execution results. If the execution results of the two cores are inconsistent, the system immediately enters a safe mode, stops running, and performs fault diagnosis and repair. Heterogeneous parallel multi-core indicates that a plurality of processor cores are configured in a computer architecture to detect the same instruction, and these processor cores may have different architectures, functions, or performance characteristics. The above error detections may run in parallel in both the local computing domain and the extended computing domain according to error detection requirements.

The foregoing embodiment may be applied to model training, including the following steps:

Step 1: Splitting a model training job into a plurality of sub model training jobs.

Step 2: Sending the sub model training jobs to the local computing units in the server and the extended computing units in the extended computing domain of the server system for execution, to obtain trained sub models.

Step 3: Acquiring the sub models trained by the local computing units and the sub models trained by the extended computing units.

Step 4: Merging the sub models trained by the local computing units and the sub models trained by the extended computing units to obtain a trained model.

Figure 8:
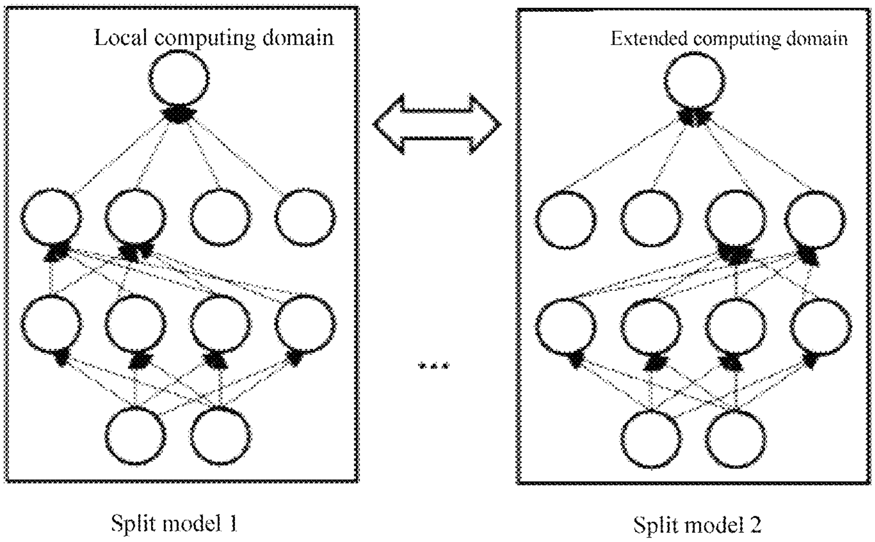
FIG. 8 is a schematic diagram of vertical splitting of a model in distributed training according to one or more exemplary embodiments.

In specific implementation, an entire model is divided into a plurality of sub models, each computing unit uses the same data to train different sub models, and the processor control domain merges the sub models trained by the computing units to obtain the trained model. Taking vertical splitting of a model in distributed training as an example, as shown in FIG. 8, the local computing domain and the extended computing domain train different sub models, and computational communication contents of the server and the extended computing domain are results generated by the parallel modal computing units of each model.

The foregoing embodiment may be applied to federated learning, including the following steps:

Step 1: Splitting a federated learning job into model training tasks and parameter update tasks.

Step 2: Sending the model training jobs to the extended computing units in the extended computing domain of the server system, whereby the extended computing units use local data to train models corresponding to the model training jobs to obtain gradients, where the models corresponding to the model training jobs are latest models updated by the local computing units.

Step 3: Acquiring the gradients trained by the extended computing units, and merging the gradients trained by the plurality of extended computing units to obtain a merged gradient.

Step 4: Sending the parameter update tasks to the local computing units in the server, whereby the local computing units update model parameters of models based on a merged gradient in the parameter update tasks, where the merged gradient is a result of merging gradients trained by the plurality of extended computing units.

Step 5: Acquiring the latest models updated by the local computing units and sending the latest models to the extended computing units, whereby the extended computing units update their models.

Figure 9:
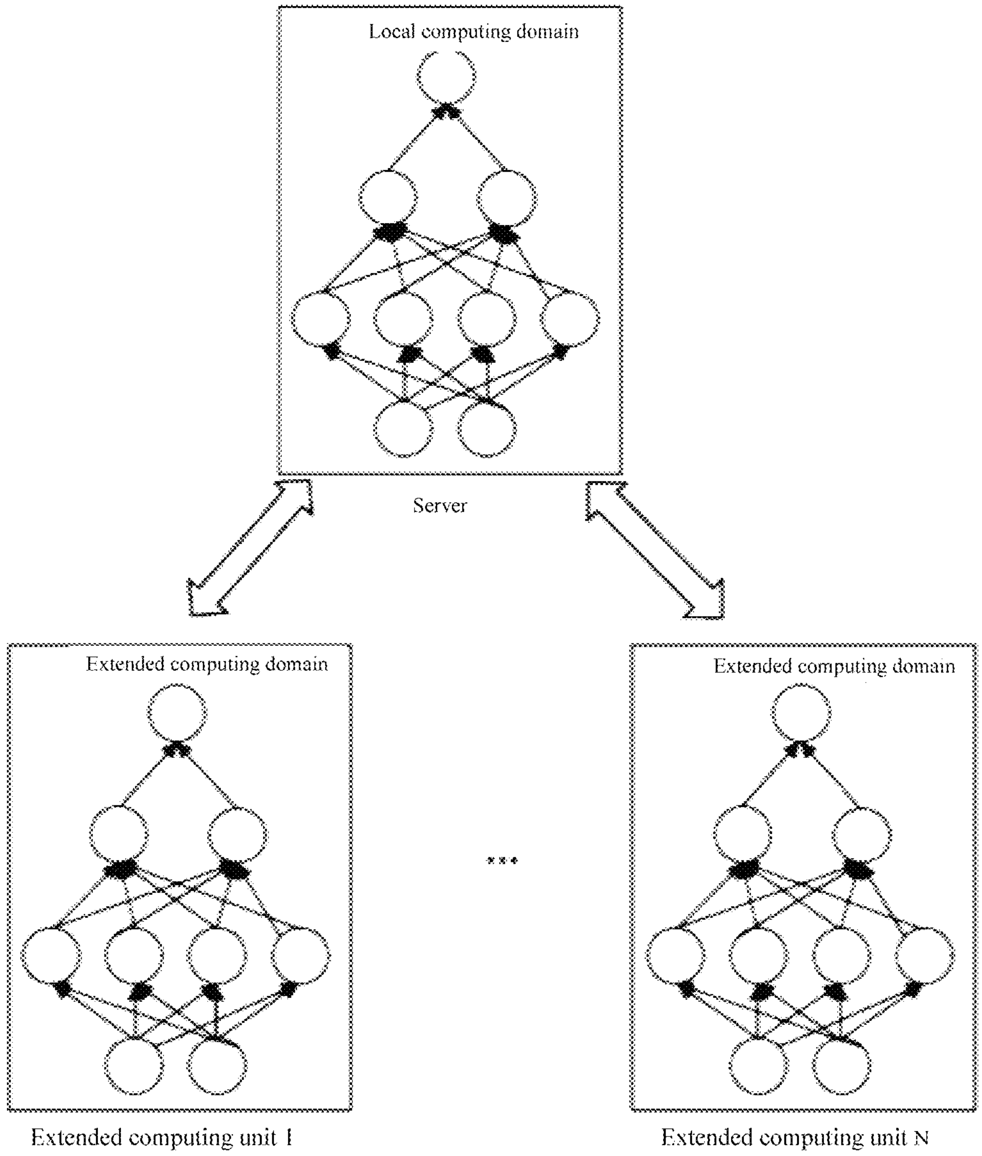
FIG. 9 is a schematic diagram of federated learning according to one or more exemplary embodiments.

In specific implementation, as shown in FIG. 9, each extended computing unit in the extended computing domain downloads a latest model from the server, trains the model with local data to obtain a gradient, encrypts the gradient, and uploads the gradient to the server; the server merges the gradients of the extended computing units to obtain a merged gradient; the local computing unit updates model parameters based on the merged gradient and returns the updated model to each extended computing unit in the extended computing domain; and each extended computing unit in the extended computing domain updates its model. The above process continues until the computation ends.

The following introduces a job execution apparatus provided in an embodiment of the present application. The job execution apparatus described below may be referenced to the job execution method described above.

Figure 10:
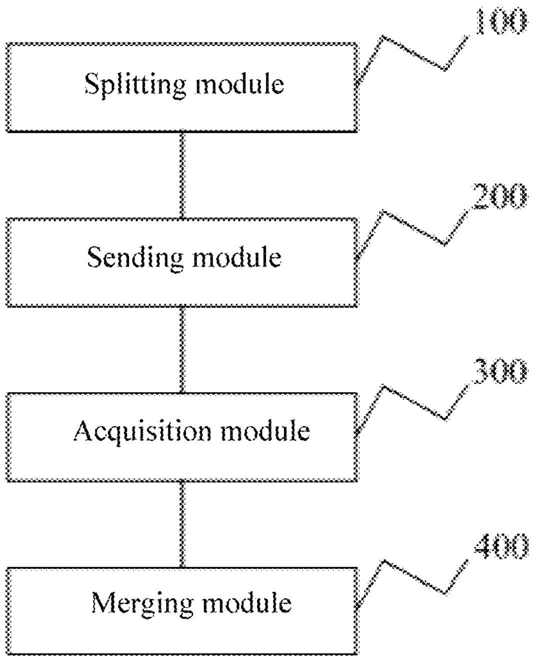
FIG. 10 is a structural diagram of a job execution apparatus according to one or more exemplary embodiments.

FIG. 10 is a structural diagram of a job execution apparatus according to an exemplary embodiment. As shown in FIG. 10, the job execution apparatus includes:

- a splitting module 100, configured to acquire a target job and split the target job into a plurality of computing tasks;
- a sending module 200, configured to send the computing tasks to the local computing units in the server and the extended computing units in the extended computing domain of the server system for execution;
- an acquisition module 300, configured to acquire local computing task execution results of the local computing units and extended computing task execution results of the extended computing units; and
- a merging module 400, configured to merge the local computing task execution results and the computing task execution results to obtain an execution result of the target job.

The job execution apparatus provided in the present application utilizes the server system provided in the foregoing embodiments to execute the target job, thereby improving job execution efficiency.

Based on the foregoing embodiment, as an implementation, the job execution apparatus further includes:

- a division module, configured to divide the computing tasks into local computing tasks and extended computing tasks based on delay sensitivity of the computing tasks and communication sparsity between the different computing tasks.

Based on the foregoing embodiment, as an implementation, the local computing tasks are computing tasks with delay sensitivity greater than or equal to a first preset value, the extended computing tasks are computing tasks with delay sensitivity less than the first preset value, the communication sparsity between the extended computing tasks is less than or equal to a second preset value, and the communication sparsity between the extended computing tasks and the local computing tasks is greater than the second preset value.

Based on the foregoing embodiment, as an implementation, the sending module 200 is configured to: send the local computing tasks to the local computing units in the server for execution, and send the extended computing tasks to the extended computing units in the extended computing domain of the server system for execution.

Based on the foregoing embodiment, as an implementation, the target job is a model training job, and the splitting module 100 is configured to split the model training job into a plurality of sub model training jobs; correspondingly, the sending module 200 is configured to send the sub model training jobs to the local computing units in the server and the extended computing units in the extended computing domain of the server system for execution, to obtain trained sub models; correspondingly, the acquisition module 300 is configured to acquire the sub models trained by the local computing units and the sub models trained by the extended computing units; and correspondingly, the merging module 400 is configured to merge the sub models trained by the local computing units and the sub models trained by the extended computing units to obtain a trained model.

Based on the foregoing embodiment, as an implementation, the target job is a federated learning job, and the splitting module 100 is configured to split the federated learning job into model training tasks and parameter update tasks; correspondingly, the sending module 200 is configured to send the parameter update tasks to the local computing units in the server, whereby the local computing units update model parameters of models based on a merged gradient in the parameter update tasks, where the merged gradient is a result of merging gradients trained by the plurality of extended computing units; and send the model training jobs to the extended computing units in the extended computing domain of the server system, whereby the extended computing units use local data to train models corresponding to the model training jobs to obtain gradients, where the models corresponding to the model training jobs are latest models updated by the local computing units; correspondingly, the acquisition module 300 is configured to acquire the gradients trained by the extended computing units and acquire the latest models updated by the local computing units; and correspondingly, the merging module 400 is configured to merge the gradients trained by the plurality of extended computing units to obtain the merged gradient.

With regard to the apparatus in the foregoing embodiment, the specific manners that various modules execute operations are described in detail in the embodiments relating to the method, and details will not be elaborated herein.

Figure 11:
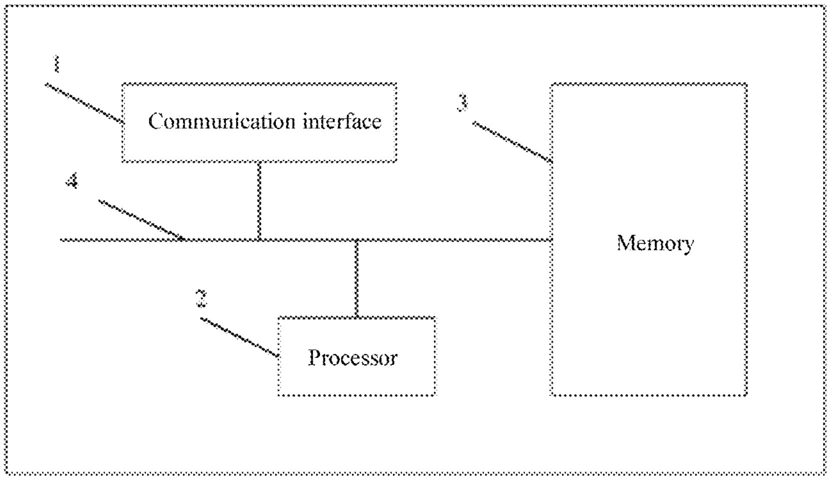
FIG. 11 is a structural diagram of an electronic device according to one or more exemplary embodiments.

Based on hardware implementation of the foregoing program modules, and in order to implement the method of the embodiments of the present application, an embodiment of the present application further provides an electronic device. FIG. 11 is a structural diagram of an electronic device according to an exemplary embodiment. As shown in FIG. 11, the electronic device includes:

- a communication interface 1, capable of exchanging information with other devices such as a network device; and
- a processor 2 connected to the communication interface 1 to exchange information with other devices, and configured to execute the job execution method provided in one or more technical solutions above when running computer-readable instructions. The computer-readable instructions are stored in a memory 3.

In practical applications, the various components in the electronic device are coupled together through a bus system 4. It may be understood that the bus system 4 is configured to implement connection and communication between the components. In addition to a data bus, the bus system 4 further includes a power bus, a control bus, and a status signal bus. However, for clarity of description, various buses are marked as the bus system 4 in FIG. 11.

The memory 3 in the embodiment of the present application is configured to store various types of data to support the operation of the electronic device. Examples of the data include any computer-readable instructions configured for operating on the electronic device.

It may be understood that the memory 3 may be a volatile or non-volatile memory, and may further include both volatile and non-volatile memories. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM). The magnetic surface memory may be either a magnetic disc memory or a magnetic tape memory. The volatile memory may be a random access memory (RAM) used as an external cache. By way of example but not limitation, many forms of RAM are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 3 described in the embodiment of the present application is intended to include, but is not limited to, these and any other suitable types of memories.

The method disclosed in the foregoing embodiments of the present application may be applied to the processor 2 or implemented by the processor 2. The processor 2 may be an integrated circuit chip having a signal processing capability. During implementation, the steps of the foregoing method may be completed by hardware integrated logic circuits in the processor 2 or instructions in a form of software. The processor 2 may be a general-purpose processor, a DSP, or other programmable logic devices, discrete gates or transistor logic devices, discrete hardware components, or the like. The processor 2 may implement or execute the methods, steps, and logic block diagrams disclosed in the embodiments of the present application. The general-purpose processor may be a microprocessor, any conventional processor, or the like. The steps of the method disclosed in the embodiments of the present application may be directly embodied as being executed by a hardware decoding processor, or as being executed by a combination of hardware and software modules in the decoding processor. The software modules may be located in a storage medium, the storage medium is located in the memory 3, and the processor 2 reads a program in the memory 3 and combines the program with hardware to complete the steps of the foregoing method.

The processor 2, when executing the program, implements the corresponding processes in the various methods of the embodiments of the present application. For the sake of simplicity, details will not be repeated herein.

In exemplary embodiments, an embodiment of the present application further provides one or more non-volatile computer-readable storage media storing computer-readable instructions, such as the memory 3 storing computer-readable instructions. The computer-readable instructions may be executed by the processor 2 to complete the foregoing method steps. The computer-readable storage media may be memories such as an FRAM, an ROM, a PROM, an EPROM, an EEPROM, a flash memory, a magnetic surface memory, an optical disc, and a CD-ROM.

A person of ordinary skill in the art may understand that all or part of the steps of the foregoing method embodiments may be completed by a program instructing related hardware. The program may be stored in a computer-readable storage medium, and the program, when executed, executes the steps of the foregoing method embodiments. The storage medium includes various media that may store program code, such as a mobile storage device, an ROM, an RAM, a disk, or a compact disc.

Alternatively, the foregoing integrated units of the present application, when implemented in a form of software functional modules and sold or used as independent products, may be stored in a computer-readable storage medium. Based on such an understanding, the technical solutions of the embodiments of the present application essentially or the part contributing to the related art may be embodied in a form of a software product. The computer software product is stored in a storage medium, and includes a plurality of instructions to enable an electronic device (which may be a personal computer, a server, a network device, or the like) to perform all or part of the methods in the embodiments of the present application. The storage medium includes various media that may store program code, such as a mobile storage device, an ROM, an RAM, a disk, or a compact disc.

The above describes only the specific implementations of the present application, but the scope of protection of the present application is not limited thereto. Any variation or replacement readily conceivable by any skilled person familiar with this technical field within the technical scope disclosed by the present application shall fall within the scope of protection of the present application. Therefore, the scope of protection of the present application shall be subject to the scope of protection of the claims.

What is claimed is:

1. A server system, comprising a server and an extended computing domain, wherein the server comprises a processor control domain and a local computing domain, the local computing domain comprises a plurality of local computing units, the processor control domain is connected to the local computing units through peripheral component interconnect express protocol interfaces, and the local computing units are configured to execute local computing tasks; and the extended computing domain comprises an extended controller and a plurality of extended computing units connected to the extended controller, the server is connected to the extended controller through an extended cable compliant with a peripheral component interconnect express protocol and/or an external communication interface, the extended controller is configured to communicate with the server to acquire extended computing tasks, and the extended computing units are configured to execute the extended computing tasks;

wherein the extended controller comprises a switching unit, the switching unit comprises an upstream port, a switching matrix, and downstream ports, which are sequentially connected; the switching unit is configured for data flow communication with the processor control domain through the upstream port, and data flow communication with the extended computing units through the downstream ports; each downstream port is connected to one of the extended computing units, and there is a communication connection between every two downstream ports in the switching matrix.

2. The server system according to claim 1, wherein the extended controller communicates with the server based on an external communication protocol, and the external communication protocol comprises a remote direct memory access communication protocol.

3. The server system according to claim 1, wherein the extended controller comprises a control unit and the switching unit, the control unit is configured for control flow communication with the server, and the switching unit is configured for data flow communication with the server.

4. The server system according to claim 1, wherein each of the extended computing units comprises any one or a combination of any of a graphics processing unit, a field-programmable gate array, and an extended processing unit.

5. The server system according to claim 1, wherein the extended computing units communicate based on an internal communication protocol, and the internal communication protocol comprises the peripheral component interconnect express protocol.

6. The server system according to claim 1, wherein in a process of communication between the extended controller and the server, a controller at a sending end enters a kernel state to create a communication link between the sending end and a receiving end, copies data that needs to be sent in a memory of the sending end to a hardware cache, encapsulates data that needs to be sent in the hardware cache into data packets according to a communication protocol between the sending end and the receiving end, and sends the data packets to the receiving end through the communication link, wherein when the sending end is the server and the receiving end is one of the extended computing units, the controller at the sending end is the processor control domain; and when the sending end is the one of the extended computing unit and the receiving end is the server, the controller at the sending end is the extended controller.

7. The server system according to claim 2, wherein in a process of communication between the extended controller and the processor control domain based on the remote direct memory access communication protocol, a controller at a sending end bypasses a kernel state, copies data that needs to be sent to a hardware cache, encapsulates data that needs to be sent in the hardware cache into data packets based on the remote direct memory access communication protocol, and sends the data packets to a receiving end, wherein when the sending end is the server and the receiving end is one of the extended computing units, the controller at the sending end is the processor control domain; and when the sending end is the one of the extended computing units and the receiving end is the server, the controller at the sending end is the extended controller.

8. The server system according to claim 1, wherein a memory of one of the local computing units communicates with a memory of one of the extended computing units through direct memory access.

9. The server system according to claim 1, wherein the local computing units are configured to execute computing tasks with delay sensitivity greater than or equal to a first preset value, the extended computing units are configured to execute computing tasks with delay sensitivity less than the first preset value, communication sparsity between computing tasks executed within the extended computing domain is less than or equal to a second preset value, and communication sparsity between computing tasks executed within the extended computing domain and computing tasks executed within the local computing domain is greater than the second preset value.

10. The server system according to claim 1, wherein the processor control domain is configured to merge computing task execution results of the local computing units and computing task execution results of the extended computing units.

11. The server system according to claim 1, wherein the local computing units comprise any one or a combination of a graphics computing processor, a field-programmable gate array, a tensor processing unit accelerator card, a data processing unit, and a neural network processor.

12. The server system according to claim 3, wherein the control unit comprise any one or a combination of an operation control core, an instruction decoder, a clock and timing controller, and a data buffer.

13. A job execution method, being applied to a server in a server system, wherein the server system comprises the server and an extended computing domain, wherein the server comprises a processor control domain and a local computing domain, the local computing domain comprises a plurality of local computing units, the processor control domain is connected to the local computing units through peripheral component interconnect express protocol interfaces, and the local computing units are configured to execute local computing tasks; and the extended computing domain comprises an extended controller and a plurality of extended computing units connected to the extended controller, the server is connected to the extended controller through an extended cable compliant with a peripheral component interconnect express protocol and/or an external communication interface, the extended controller is configured to communicate with the server to acquire extended computing tasks, and the extended computing units are configured to execute the extended computing tasks; wherein the extended controller comprises a switching unit, the switching unit comprises an upstream port, a switching matrix, and downstream ports, which are sequentially connected; the switching unit is configured for data flow communication with the processor control domain through the upstream port, and data flow communication with the extended computing units through the downstream ports; each downstream port is connected to one of the extended computing units, and there is a communication connection between every two downstream ports in the switching matrix;

the method comprising:

acquiring a target job and splitting the target job into a plurality of computing tasks;

sending the computing tasks to the local computing units in the server and the extended computing units in the extended computing domain of the server system for execution;

acquiring local computing task execution results of the local computing units and extended computing task execution results of the extended computing units; and merging the local computing task execution results and the extended computing task execution results to obtain an execution result of the target job.

14. The job execution method according to claim 13, wherein before the sending the computing tasks to the local computing units in the server and the extended computing units in the extended computing domain of the server system for execution, the method further comprises:

dividing the computing tasks into the local computing tasks and the extended computing tasks based on delay sensitivity of the computing tasks and communication sparsity between different computing tasks.

15. The job execution method according to claim 14, wherein the local computing tasks are computing tasks with delay sensitivity greater than or equal to a first preset value, the extended computing tasks are computing tasks with delay sensitivity less than the first preset value, the communication sparsity between the extended computing tasks is less than or equal to a second preset value, and the communication sparsity between the extended computing tasks and the local computing tasks is greater than the second preset value.

16. The job execution method according to claim 14, wherein the sending the computing tasks to the local computing units in the server and the extended computing units in the extended computing domain of the server system for execution comprises:

sending the local computing tasks to the local computing units in the server for execution, and sending the extended computing tasks to the extended computing units in the extended computing domain of the server system for execution.

17. The job execution method according to claim 13, wherein the target job is a model training job, and the splitting the target job into a plurality of computing tasks comprises:

splitting the model training job into a plurality of sub model training jobs;

correspondingly, the sending the computing tasks to the local computing units in the server and the extended computing units in the extended computing domain of the server system for execution comprises:

sending the sub model training jobs to the local computing units in the server and the extended computing units in the extended computing domain of the server system for execution, to obtain trained sub models;

correspondingly, the acquiring local computing task execution results of the local computing units and extended computing task execution results of the extended computing units comprises:

acquiring the sub models trained by the local computing units and the sub models trained by the extended computing units;

correspondingly, the merging the local computing task execution results and the extended computing task execution results to obtain an execution result of the target job comprises:

merging the sub models trained by the local computing units and the sub models trained by the extended computing units to obtain a trained model.

18. The job execution method according to claim 13, wherein the target job is a federated learning job, and the splitting the target job into a plurality of computing tasks comprises:

splitting the federated learning job into model training tasks and parameter update tasks;

correspondingly, the sending the computing tasks to the local computing units in the server and the extended computing units in the extended computing domain of the server system for execution comprises:

sending the parameter update tasks to the local computing units in the server, whereby the local computing units update model parameters of models based on a merged gradient in the parameter update tasks, wherein the merged gradient is a result of merging gradients trained by the extended computing units; and sending the model training tasks to the extended computing units in the extended computing domain of the server system, whereby the extended computing units use local data to train models corresponding to the model training tasks to obtain gradients, wherein the models corresponding to the model training tasks are latest models updated by the local computing units;

correspondingly, the acquiring local computing task execution results of the local computing units and extended computing task execution results of the extended computing units comprises:

acquiring the gradients trained by the extended computing units; and acquiring the latest models updated by the local computing units;

correspondingly, the merging the local computing task execution results and the extended computing task execution results comprises:

merging the gradients trained by the extended computing units to obtain the merged gradient.

19. An electronic device, comprising:

a memory, configured to store computer programs; and a processor, configured to, when executing the computer programs, implement the steps of the job execution method according to claim 13.

20. A computer-readable storage media storing computer programs, the computer programs, when executed by processors, implement the steps of the job execution method according to claim 13.

* * * * *